T. A. BRYSON.
CENTRIFUGAL MACHINE.
APPLICATION FILED MAR. 22, 1917.
1,385,982.
Patented Aug. 2, 1921.
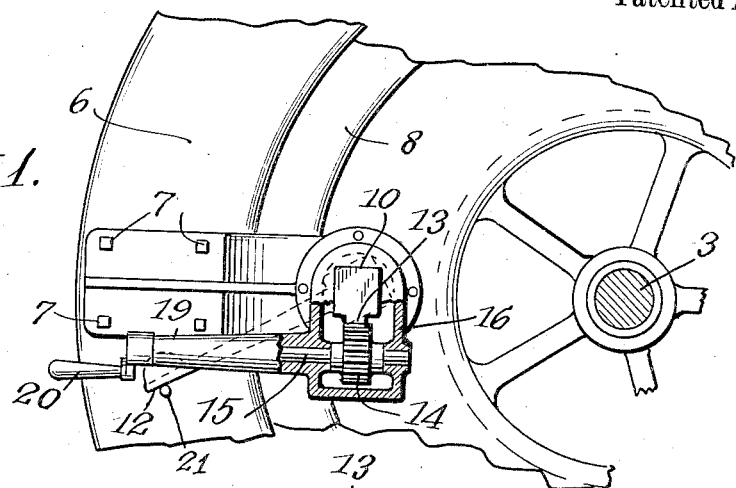
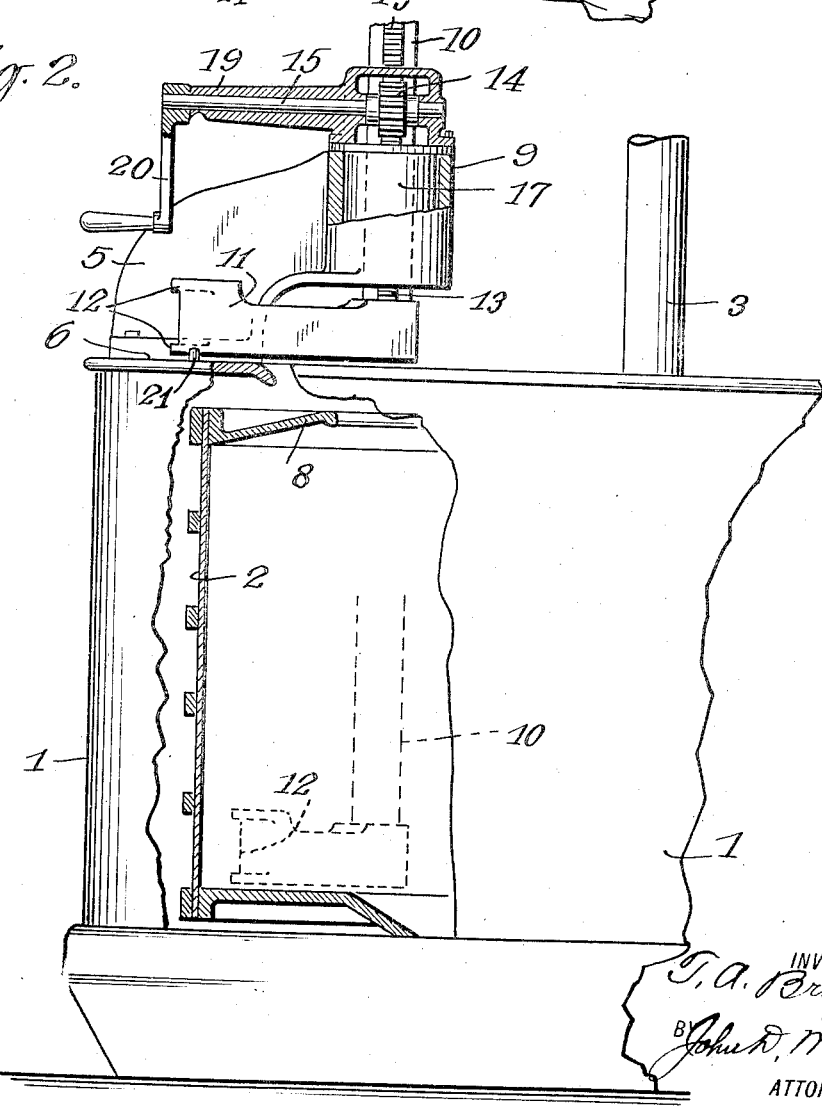

UNITED STATES PATENT OFFICE.

TANDY A. BRYSON, OF TROY, NEW YORK, ASSIGNOR TO TOLHURST MACHINE WORKS, A CORPORATION OF NEW YORK.

CENTRIFUGAL MACHINE.

1,385,982.      Specification of Letters Patent.      Patented Aug. 2, 1921.

Application filed March 22, 1917. Serial No. 156,563.

*To all whom it may concern:*

Be it known that I, TANDY A. BRYSON, a citizen of the United States, residing at Troy, in the county of Rensselaer and State of New York, have invented new and useful Improvements in Centrifugal Machines, of which the following is a specification.

The invention relates to centrifugal machines and more particularly to devices or mechanisms for removing from the vertical wall of the basket desiccated or partly desiccated materials preparatory to unloading.

Objects and advantages of the invention will be set forth in part hereinafter, and in part will be obvious herefrom, the same being realized and attained through the instrumentalities and combinations pointed out in the appended claims.

The invention consists in the novel parts, constructions, arrangements, combinations and improvements herein shown and described.

The accompanying drawings herein referred to, and constituting a part hereof, illustrate one embodiment of the invention, the same serving in connection with the description to explain the principles thereof.

Of the drawings:

Figure 1 is a fragmentary plan, with parts broken away and other parts in section, of a machine embodying the invention; and Fig. 2 is a fragmentary elevation, likewise with parts in section and with parts broken away, corresponding to Fig. 1.

Referring to the accompanying drawings, illustrating by way of example one embodiment of the invention, a casing 1 of a centrifugal machine is shown, and therewithin the rotatable basket 2, within which basket the material to be dried is placed and whirled in the usual manner. The shaft 3 for rotating the basket 2 may be of any desired form, so far as concerns the present invention.

The scraping mechanism, or device for clearing the desiccated material from the vertical walls of the basket 2 and depositing it upon the bottom thereof preparatory to unloading, as embodied, comprises a fixed bracket 5, attached in permanent or immovable position upon the top 6 of the casing 1 by suitable means such as a plurality of bolts 7. The bracket 5 extends upwardly and inwardly, preferably in a substantially radial direction, to a point just within the inner edge of the top plate 6 of the casing 1, and also within the top plate 8 of the basket 2.

Such inward terminus of the bracket 5 is formed into a vertically disposed, hollow column 9, shown partly in section in Fig. 1. Within the hollow column or casing 9 is a relatively long, vertically disposed rod or bar 10, preferably of rectangular cross section as best appears from Fig. 2. At the lower end thereof there is attached to the bar 10 a scraper 11, having its end 12 adapted to engage with the circular vertical wall of the basket 2, to scrape and precipitate the adherent material, when the scraper 11 is swung into operative position.

The bar 10 is utilized both to raise and lower the scraper 11 and to swing it to and from the vertical wall of the basket. On one of the faces of the bar 10 is formed a geared rack 13, coöperating with a suitable pinion to raise and to lower the bar and therewith the scraper 11. In mesh with the gear rack 13 is a pinion 14, which pinion is fixed upon a shaft 15. Shaft 15 is journaled in the side walls of a housing 16, which housing is supported on the top of the column 9 and is rotatable relatively thereto. The rectangular bar 10 extends upwardly through the top of housing 16, the top of the housing being correspondingly recessed to closely surround the bar. The housing 16 is thus rotatably mounted on the column 9, by means of the bushing 17, which bushing is preferably circular on the outside to fit the interior of the column, and has a rectangular interior aperture to fit about the rod 10. Thus, when the housing is rotated, the bar 10 and scraper 11 will be rotated therewith.

Means are provided for imparting the up and down and also the swinging motion to scraper 11, and in accordance with one feature of the invention, a single mechanism or device is provided for this purpose. In the embodied form, extending outwardly upon the housing 16 and fixed thereto, is a hollow sleeve 19 within which sleeve extends the shaft 15 of the pinion 14. Fixed to the external end of the shaft 15 is a crank 20.

The manner of operation of the heretofore described mechanism is substantially as follows:—

The sleeve 19 serves as an arm or lever to rotate the housing 16 to and fro upon the top of the column 9. When the housing 16 is so rotated, the bar 10 is rotated therewith in one direction or the other, and thereby the scraper 11 is swung toward and against the vertical wall of the basket 2, or is swung outwardly away therefrom. The crank 20 is rotated in one direction or the other to raise or lower the bar 10 and therewith the scraper 11.

If the scraper 11 be considered to be in the inoperative position, that is, as resting upon the top plate 6 of the casing 1, as shown in Fig. 1 of the drawings, the crank 20 may be rotated to lift it slightly upwardly. The sleeve 15 is then swung angularly to swing the scraper 11 inwardly clear of the plate 6. Crank 20 is then rotated to lower the scraper 11 into the basket 2. Sleeve 15 is then swung in the opposite direction to bring the scraper 11 against the vertical wall of the basket 2 to dislodge the adherent desiccated, or partly desiccated, material. The crank 20 may be rotated as and when desired to move the scraper 11 upwardly and downwardly along the basket wall. When the operation is completed, the scraper may be swung inwardly by means of the arm or sleeve 15, and by the rotation of crank 20 the scraper 11 may be elevated out of the basket, and the sleeve 15 swung to bring the scraper into the inoperative position, resting upon the top of plate 6, as shown in Fig. 1. The stop 21 may be employed to prevent accidental swinging out of the scraper in the elevated position.

From all the foregoing it will be understood that a mechanism has been provided realizing the objects and advantages herein set forth, together with other objects and advantages which will be obvious, or which may be ascertained from practice with the invention. It will also be understood that changes may be made in the exact structure shown and described without departing from the principles of the invention and without sacrificing its chief advantages.

What I claim as my invention and desire to secure by Letters Patent is:

1. A centrifugal machine including in combination, a basket, a casing, a bracket on the casing, a scraper carrying bar journaled in said bracket, rotatable means engaging said bar and swingable about the axis thereof to raise and lower the same and to move the scraper to and from the basket wall.

2. A centrifugal machine including in combination a basket, a casing, a bracket on the casing, a vertically movable bar rotatably supported on the bracket, a scraper connected to the lower end of the bar, rack teeth arranged along the bar, a pinion supported on said bracket and meshing with the rack teeth, a shaft on which the pinion is mounted, said shaft being rotatable to raise and lower the scraper and being swingable to swing the scraper to and from the basket wall.

3. A centrifugal machine including in combination a basket, a casing, a bracket in fixed position on the casing, a vertically movable bar supported on the bracket, a scraper carried at the lower end of the bar, and a shaft rotatable for lowering and raising the bar and swingable about said bar as an axis to move the scraper to and from the basket wall, and a geared connection between the shaft and bar for raising and lowering it.

4. A centrifugal machine including in combination a basket, a casing, a bracket in fixed position on the casing and elevated sufficiently thereabove to permit the scraper to rest upon the casing, a vertically movable bar rotatably supported upon the bracket, a scraper carried by the lower end of the bar, and a handle for raising and lowering the bar and for rotating it to swing the scraper to and from the basket wall and into inoperative position on the top of the casing.

5. A centrifugal machine including in combination a basket, a casing, a supporting bracket in fixed position on the casing, a housing rotatably mounted on the bracket, a pinion rotatably mounted on the housing, a bar mounted in the housing to move longitudinally relatively thereto, but rotatably with the housing, a scraper fixed to the bar, and a shaft rotatable for rotating the pinion and swingable about said bar for rotating the housing.

6. A centrifugal machine including in combination a basket, a casing, a bracket in fixed position on the casing, a housing rotatably mounted on the bracket, a vertically movable bar within the housing at its center of rotation and rotating therewith, rack teeth extending along the bar, and a pinion and a shaft therefor mounted to swing about the axis of the housing and engaging the rack teeth.

7. In a centrifugal machine discharger, a fixed bracket, a sleeve journaled therein to swing about a vertical axis, a rod movable only vertically in the sleeve, a hand crank journaled in bearings on the sleeve, a pinion fixed to the hand crank and engaging teeth on the rod, and a plow fixed to the rod below the sleeve.

In testimony whereof, I have signed my name to this specification, in the presence of two subscribing witnesses.

TANDY A. BRYSON.

Witnesses:
M. K. Buskin,
R. H. Dean,